United States Patent [19]
Waters, Jr.

[11] 3,982,463
[45] Sept. 28, 1976

[54] PIANO-LIKE MUSICAL INSTRUMENT

[76] Inventor: James B. Waters, Jr., 12111 Parklawn Drive, Suite 206, Rockville, Md. 20852

[22] Filed: Jan. 13, 1975

[21] Appl. No.: 540,564

[52] U.S. Cl. ................................. 84/476; 84/404; 84/423; 84/470
[51] Int. Cl.² ........................................ G09B 15/02
[58] Field of Search ............ 84/470, 423, 330, 402, 84/406, 1, DIG. 7, DIG. 8, 471, 476, 477 R, 478, 454, 404

[56] References Cited
UNITED STATES PATENTS

| | | | |
|---|---|---|---|
| 491,833 | 2/1893 | Bowen et al. | 84/476 |
| 2,236,638 | 4/1941 | Adams | 84/476 |
| 2,315,793 | 4/1943 | Jay | 84/476 |
| 2,723,583 | 11/1955 | Norris | 84/454 |
| 2,964,988 | 12/1960 | Merchant | 84/404 X |
| 3,342,094 | 9/1967 | Wilson | 84/423 |

OTHER PUBLICATIONS

Wexler Catalog No. 66, David Wexler Co., Chicago, Ill., 1965, p. 453.

Primary Examiner—John Gonzales
Attorney, Agent, or Firm—Strauch, Nolan, Neale, Nies & Kurz

[57] ABSTRACT

A piano-like musical instrument to be played by a group of people including individual tone blocks each played by one person using a music score coded to that one person's note. The tone blocks may be arranged as an oversized piano keyboard or may be separated and distributed to each player. Each tone block may include the sharp and/or flat of the note.

14 Claims, 7 Drawing Figures

PIANO-LIKE MUSICAL INSTRUMENT

BACKGROUND OF THE INVENTION

Various musical instruments simulating a standard piano with a standard keyboard or portion of a keyboard are well known. Such instruments cover the range from small, inexpensive toys for education of and/or enjoyment by children to large and rather expensive instruction devices for large groups such as a band or orchestra.

Known examples of musical instruments within this range include popular, small one or two octave pianos for playing by children and such instruments usually have some sort of music score coded to the keys for educational purposes. One example of such an instrument is the "Portable Organ 24" distributed by Lash-Tamaron Distributors of Saddle Brook, New Jersey. Each key of the instrument is a different color, coded to a number of music scores so that a child may play a particular tune merely by striking the keys in order according to a color coded music score.

A more complex instrument is disclosed in U.S. Pat. No. 3,420,135. A piano-like instrument has keys which are lit in sequence according to a contact card inserted in the instrument. The student plays a composition by striking the keys as they are lighted. A similar instrument having sequentially lighted windows adjacent each key, rather than lights within the keys, is disclosed in U.S. Pat. No. 1,696,901. The lighted key concept is further developed as a group instruction device in U.S. Pat. No. 2,225,084 which discloses a large display board having individual notes illustrated which are lighted as they are played on a control keyboard by the director of a band to signal appropriate players in the band to play the illustrated note.

Another instruction device is disclosed in U.S. Pat. No. 3,395,600. An illustrated card is placed over the keyboard of a standard piano and includes visual instructions as to which notes to play to produce various chords.

An invention more closely related to the instant invention is disclosed in U.S. Pat. No. 2,879,685. A board is programmed to play a tune by having openings therethrough arranged on a musical score imprinted on the board. Individual tone blocks producing assigned tones are inserted in the openings of the board according to the assigned tones noted on the board. Then, each note is played by depressing each block in order with one's finger to produce a pleasant tune.

The prior art does not disclose individual tone blocks capable of producing one or more notes and assembled together to form an oversized piano keyboard and music score for each note, coded to that note so that the instrument may be played by a group of persons, one player assigned to each note, for purposes of enjoyment by and/or education of persons having a musical background or having almost no musical experience at all.

OBJECTS OF THE INVENTION

Therefore, it is a primary object of the invention to provide a musical instrument, playable by a group of persons, having the appearance of a piano and having an oversized, simulated keyboard with individual notes played by individual players.

It is an object of the invention to provide a musical instrument, playable by a number of persons, comprising a number of individual tone blocks, capable of producing the notes of a diatonic or chromatic scale octave, each tone block being played by one person, and including music scores for each tone block, coded to the note produced by that tone block.

It is another object of the invention to provide a musical instrument playable by a group of persons and being in the form of a plurality of tone blocks, each shaped as a cube, and having tone generators therein for producing an assigned tone and the half-note to at least one side (e.g., the sharp and/or flat) of the assigned tone.

A further object of the invention is to provide a musical instrument in the form of an oversized piano keyboard having an arrangement of tone blocks in the form of a standard piano keyboard of white and black keys, selected tone blocks having a common black key (e.g., the sharp of the lower note and the flat of the higher note) having matingly interfitting black key segments on such adjacent tone blocks which interfit to form a single black key.

Further novel features and other objects of this invention will become apparent from the following detailed description, discussion and the appended claims taken in conjunction with the accompanying drawings.

BRIEF DESCRIPTION OF DRAWINGS

Preferred structural embodiments of this invention are disclosed in the accompanying drawings in which.

DESCRIPTION OF THE PREFERRED EMBODIMENTS

Figure 1:
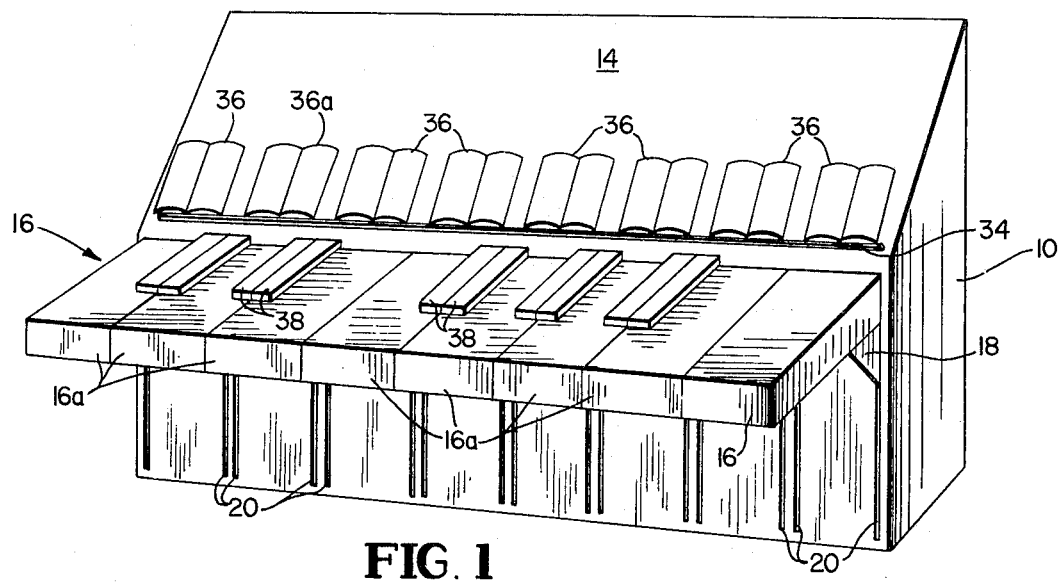
FIG. 1 is a perspective view of one embodiment of the invention, showing a number of tone blocks arranged on an upstanding structure to simulate a piano with oversized keys forming a piano keyboard.

A primary embodiment of the invention, constructed as an upright piano with a chromatic octave of oversized piano keys, is illustrated in FIG. 1. The piano has an upstanding structure 10 including a front, lower vertical panel 12 and an adjoining, upper sloped shelf 14. A plurality of tone blocks 16 simulating piano keys are mounted on panel 12 by angle brackets 18 friction fit into or otherwise suitably slideably secured within vertical slots 20 formed in panel 12. Thus each piano key or tone block 16 is vertically adjustable to suit the height of a player.

The invention is adapted to be played by a group of persons, one person playing each key or tone block 16. Thus, each tone block 16 has the appearance of a standard piano key, but is greatly oversized in dimension with respect to a standard piano key so that there is sufficient room in front of the invention for all the players, one for each tone block 16.

Figure 2:
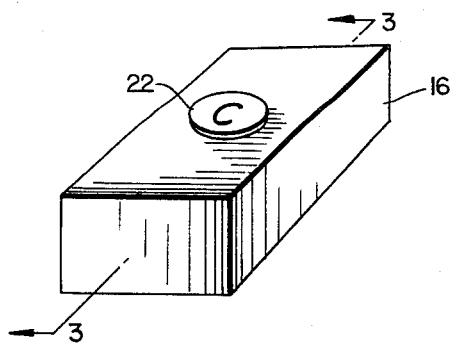
FIG. 2 is an enlarged scale perspective view of one of the tone blocks shown in FIG. 1.
Figure 3:
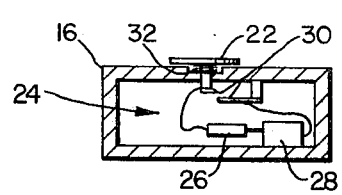
FIG. 3 is a sectional view taken along lines 3—3 of FIG. 2.

One form of a single tone block 16 representing the key C is shown in FIGS. 2 and 3. An enclosure simulating a piano key may include manually depressable means such as a button or plate 22 for activating a tone generator 24 within tone block 16 (FIG. 3) which is set to produce a C note. Tone generator 24 per se forms no part of this invention and might be a bell or other mechanically activated device to produce a predetermined tone, or tone generator 24 could be electrically actuated as shown in FIG. 3. In this case, tone generator 24 includes a battery 26, or electrically energized tone producer 28, which may include an amplifier and speaker (not shown) and contacts 30, all wired in series, contacts 30 being closed by depression of button 22 and opened by action of a compression spring 32, mounted between button 22 and the top of tone block 16, when button 22 is released.

Figure 7:
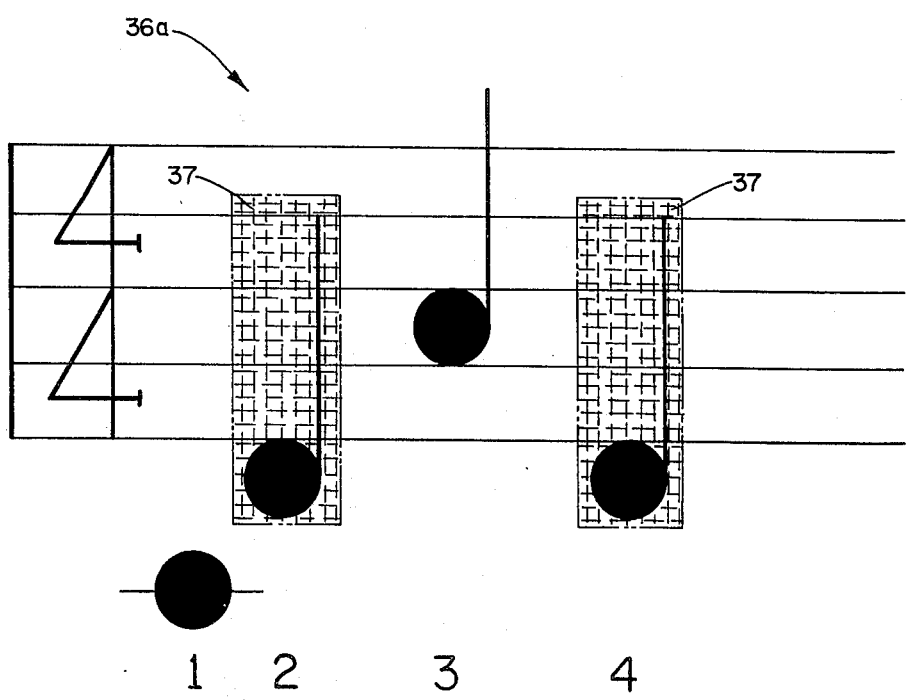
FIG. 7 is a plan view of a portion of a music score for an individual note.

Shelf 14 includes easels 34, upon which are mounted music scores 36, one for each tone block 16. Each music score 36 includes all of the notes comprising the tune to be played by all of the players, but the particular note to be played by a player assigned to that note is coded for that player. For example, music score 36a for the note D is coded as shown in FIG. 7 wherein a fraction of a music score 36a is illustrated. The two D notes shown in this fraction of the music score have a yellow background 37 so that when the note D is to be played by the person assigned to that note, he may read the score and depress the note for the time indicated by the score. Similarly, the other players of the instrument will have similar complete scores but with the background of the note assigned to them color coded with the same, or perhaps a different, color.

For example, the score for the G note will have all the notes of the particular tune to be played, but with a color background for all the G notes of the piece. The same is true for the remaining tone blocks 16 of the invention.

In FIG. 1, eight tone blocks 16 are illustrated, representing a diatonic octave, key of C. Appropriate blocks 16a also have the half tones or black keys of a standard piano keyboard in the form of enclosures 38 mounted thereon for producing such half tones (e.g., C sharp or D flat, D sharp or E flat, F sharp or F flat, G sharp or A flat and A sharp or B flat). Each enclosure 38 includes tone generation means therein which may be the same as tone generator 24, as discussed in detail above, or a different type of tone generator. As shown in FIG. 1, each enclosure 38 may be half formed on one tone block 16a and half formed on an adjacent tone block 16a so that when all of tone blocks 16a are assembled together on structure 10 to form a simulated piano, two adjacent enclosures 38 will form the appearance of a single black key of a standard piano keyboard. Additionally, each adjacent enclosure 38 may have a tone generator 24 therein, producing the same tone (e.g., A sharp is the same as B flat). Thus, a player assigned to a tone block 16a may have as many as three notes to play (e.g., G, G flat and G sharp) depending on the tune to be played and the key it is to be played in, as will appear on his music score 36.

As thus far described, the invention provides a musical instrument playable by a number of people, for just pure enjoyment or for music education purposes as well. With the versatility in the instrument provided by means for reproducing chromatic scale half-tones and with the additional feature of being able to employ a music score written in standard music notation, with the sole difference of color coding the note assigned to a particular score, rather complicated tunes may be played or practiced by individuals with the purpose of furthering their musical education. On the other hand, very simple tunes may be played by persons with little music background just for the sake of pure pleasure or for basic music education purposes.

Figure 4:
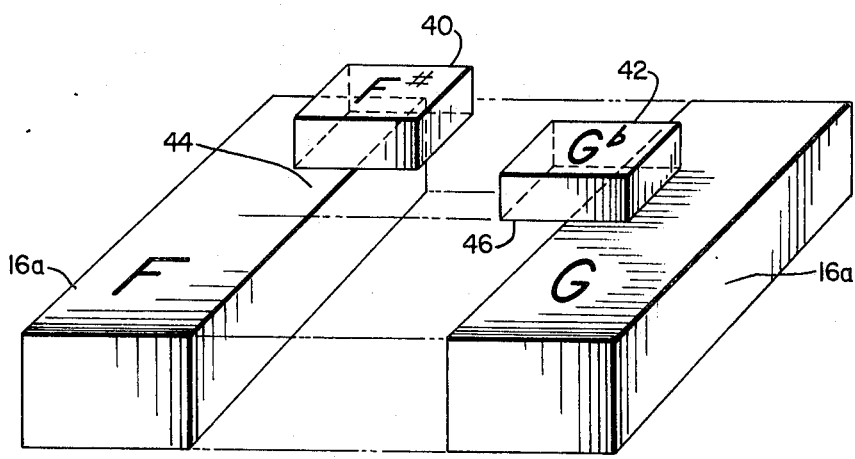
FIG. 4 is an enlarged scale exploded perspective view showing matingly interfitting components forming a single black key between two white key tone blocks.

Referring now to FIG. 4, another embodiment of tone blocks 16a with adjacent tone blocks 38 forming the appearance of a single piano keyboard black key will be discussed. In this case the black key is formed from two matingly interfittable enclosures 40 and 42, enclosure 40 having a front cutaway portion 44 filled by extension 46 on adjacent key 42 having the same external dimensions as cutaway portion 44. Normally, only one of the enclosures 40, 42 will include a tone generator. Thus when tone blocks 16a are assembled together, enclosures 40, 42 matingly interfit to form the appearance of a single black key. Enclosures 40, 42 may be made as shown or, alternatively, the cutaway portion 44 could be on key 42 with extension 46 on key 40.

In both of the embodiments thus far described, tone blocks 16 could be disassembled from the structure 10 and the group of players could seat themselves in a circle or other desired manner with their notes (tone blocks) and music scores before them. Thus, further versatility is present in the invention.

Figure 5:
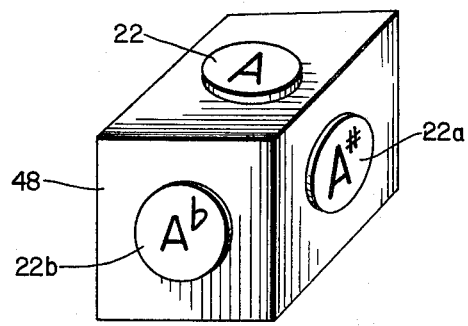
FIG. 5 is a perspective view of another embodiment of a tone block.
Figure 6:
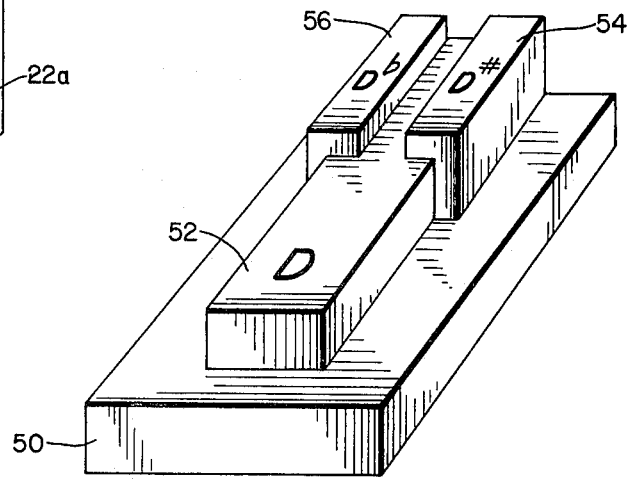
FIG. 6 is a perspective view of yet another embodiment of a tone block.

Similarly, the embodiments of the tone blocks disclosed in FIGS. 5 and 6 are primarily designed for playing, detached from any upstanding, assembling structure 10. In FIG. 5, the tone block 48 is formed as a cube, the buttons 22a and 22b for sharp and flat of the designated note respectively being arranged on sides of the cube adjacent button 22 so that cube 48 may be placed on a horizontal supporting surface (table, floor, etc.) with any button 22, 22a or 22b facing upwardly without having another note button therebeneath, on the supporting surface.

In FIG. 6, a base 50 supports a white key tone block 52 which may have black keys in the form of a sharp enclosure 54 and a flat enclosure 56 (i.e., the D key with black keys D sharp and D flat, as shown).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A piano-like musical instrument arranged to be played by two or more people simultaneously, comprising: a plurality of tone producing blocks, such as several blocks comprising an octave, each tone block including a tone generator therein and means thereon for manually actuating said tone generator; a music score for each tone producing block, each music score including all the notes of a tune to be played thereon; visual coding means on said music score located only on the notes of the score and corresponding to the tone block assigned to that score; and an upstanding structure, said tone blocks being mounted thereon and arranged side by side in piano keyboard fashion, said upstanding structure including a generally vertical face and means on said face for individually attaching said tone blocks thereto.

2. The piano-like musical instrument as claimed in claim 1 wherein said visual coding means comprise a color background surrounding a note assigned to be coded on said music score.

3. The piano-like musical instrument as claimed in claim 1 wherein all of the music scores are coded similarly.

4. The piano-like musical instrument as claimed in claim 1 wherein said upstanding structure further comprises easel means for retaining said music scores thereon, above said tone blocks.

5. The piano-like musical instrument as claimed in claim 1 wherein said each of said tone producing blocks comprises a simulated piano key of substantial, enlarged dimensions in relation to an individual key of a standard piano keyboard.

6. The piano-like musical instrument as claimed in claim 1 wherein said means for individually attaching said tone blocks to the face of said upstanding structure further comprises means for raising and lowering each of said tone blocks to suit the height of the players.

7. The musical instrument as claimed in claim 1 wherein said tone blocks are arranged side by side in piano keyboard fashion, each tone block having the appearance of a standard piano keyboard white key, said several tone blocks further comprising enclosure means, having the appearance of standard piano keyboard black keys, for encasing said additional tone generators.

8. The musical instrument as claimed in claim 7 wherein each of said enclosure means having the appearance of standard piano keyboard black keys comprises two separate enclosures matingly interfittable to form a single piano keyboard black key, one of said enclosures having a cutaway portion, the other of said enclosures having an extension thereon with dimensions corresponding to those of said one enclosure cutaway portion whereby, when said tone blocks are assembled together to form a piano-like keyboard, adjacent black key enclosures on adjacent tone blocks are matingly interfitted to form a chromatic half-tone key having the appearance of a single black key.

9. The musical instrument as claimed in claim 7 wherein said structure further comprises an upstanding structure, said tone blocks being mounted thereon to form a simulated piano keyboard, said upstanding structure and said tone blocks, when assembled together, having the overall appearance of a piano.

10. A musical instrument arranged to be played by two or more people simultaneously, comprising: a plurality of tone producing blocks, such as several blocks comprising an octave, each tone block constructed substantially as a cube and a tone generator therein and means thereon for manually actuating said tone generator; a music score for each tone producing block, each music score including all the notes of a tune to be played thereon; visual coding means on said music score located only on the notes of the score corresponding to the tone block assigned to that score; at least one of said tone blocks including three of said tone generators therein; and means for independently, manually actuating each of said tone generators, one of said tone generators producing a preselected tone of a diatonic scale, the other two of said tone generators producing the chromatic half-tones on either side of said preselected diatonic scale tone, respectively, said means for independently manually actuating each of said tone generators being located on three adjacent sides of said cube tone block whereby said cube tone block may be placed on a supporting horizontal surface to be played with one of said manual tone actuating means facing upwardly without having any other of said manual tone actuating means facing said supporting horizontal surface.

11. The musical instrument as claimed in claim 10 wherein said plurality of tone blocks are constructed as separate, independent tone blocks unconnected one to another whereby individual players may be seated in any preselected arrangement to play a tune on said musical instrument.

12. The musical instrument as claimed in claim 10 wherein the number of tone blocks corresponds to a diatonic octave.

13. The musical instrument as claimed in claim 12 wherein selected tone blocks further comprise tone generation means for producing half-tones whereby said musical instrument includes a number of notes corresponding to a chromatic scale octave.

14. A musical instrument arranged to be played by two or more persons simultaneously comprising a plurality of separate tone producing blocks, such as several blocks comprising a musical octave, each tone block including a tone generator therein for producing a preselected, assigned tone, and tone actuating means on said block externally thereof for manually actuating said tone generator, several of said tone blocks having at least one additional tone generator therein for producing half-tones of the tones assigned to said several blocks, said each of said tone blocks being constructed substantially as a cube, at least one of said several tone blocks having three of said tone generators therein and three of said tone actuating means thereon, one for each tone generator, one of said tone generators producing a preselected tone of a diatonic scale, the other two of said tone generators producing the chromatic half-tones on either side of said preselected diatonic scale tone, respectively said three of said tone actuating means being located on three adjacent sides of said one of said several tone blocks constructed as a cube whereby said cube tone block may be placed on a supporting horizontal surface to be played with one of said tone actuating means facing upwardly without having any other of said tone actuating means facing said supporting horizontal surface, whereby said plurality of separate tone producing blocks comprise musical instrument means for producing a chromatic scale octave.

* * * * *